June 3, 1924.

C. J. BURKLEY 1,496,753

METHOD OF MARKING ARTICLES OF MANUFACTURE

Filed Aug. 16, 1920

Inventor
Clem J. Burkley

By R. D. Trogner
his Attorney

Patented June 3, 1924.

1,496,753

UNITED STATES PATENT OFFICE.

CLEM J. BURKLEY, OF AKRON, OHIO, ASSIGNOR TO THE GOODYEAR TIRE & RUBBER COMPANY, OF AKRON, OHIO, A CORPORATION OF OHIO.

METHOD OF MARKING ARTICLES OF MANUFACTURE.

Application filed August 16, 1920. Serial No. 403,664.

*To all whom it may concern:*

Be it known that I, CLEM J. BURKLEY, a citizen of the United States, residing at Akron, Ohio, in the county of Summit and State of Ohio, have invented new and useful Improvements in Methods of Marking Articles of Manufacture, of which the following is a specification.

My invention relates to the method of providing articles of manufacture with a mark of identification, and it has for its primary object, the provision of a method by which rubber articles in particular may be provided with a mark of identification which shall endure throughout the life of the article.

Heretofore articles of manufacture, such as rubber inner tubes for tire casings belts, and the like, have been provided with a mark of identification, such as a trade mark, by stenciling or stamping the design on the article after the article has been formed and vulcanized. This method, however, is open to objection because the ink or other substance utilized to provide the mark must be given some time to thoroughly dry, which consequently necessitates careful handling of the articles for a certain length of time after they have been marked. The fact that the articles must be carefully handled after being marked tends to decrease the rate of their production, which is of course undesirable.

One object of my invention, therefore, resides in the provision of a method of marking articles which shall not interfere with the rapidity of production of the articles being marked.

A further object of my invention is to provided articles of manufacture with an identifying mark which shall be placed on the articles in such manner as to afford a distinct color contrast and therefore clearly define the mark or design utilized.

With these and other objects in view my invention will be more fully described, illustrated in the drawings, in which like numerals indicate like parts, and then more fully pointed out in the claims.

In practicing my invention, a rubber article, such as an inner tube, tire casing, belt, or the like, may be provided with a mark of identification by employing a suitable fibrous sheet which may be easily removed from the surface of rubber when disposed upon its uncured surface and left in engagement therewith during the vulcanization thereof. The fibrous sheet may be provided with the design or mark desired by employing a suitable transferable material, and the sheet may then preferably be covered with an uncured piece of rubber, which may have its exposed surface treated with a suitable solvent before it is disposed upon the article it is desired to mark. The piece of uncured rubber and the non-adhesive material are disposed upon the article it is desired to mark before it is vulcanized and the usual process of vulcanizing the article is followed. After the article has been vulcanized, the non-adhesive fibrous material may be removed from the piece of rubber which has become an integral part of the article being marked, and the transferable material is, of course, transferred to the surface of the rubber disposed in intimate engagement therewith.

It should be noted that the piece of uncured rubber, which is secured to the layer of material containing the transferable material, is preferably selected to secure a good color contrast between the article being marked and the transferable material forming the mark or design.

Figure 1:
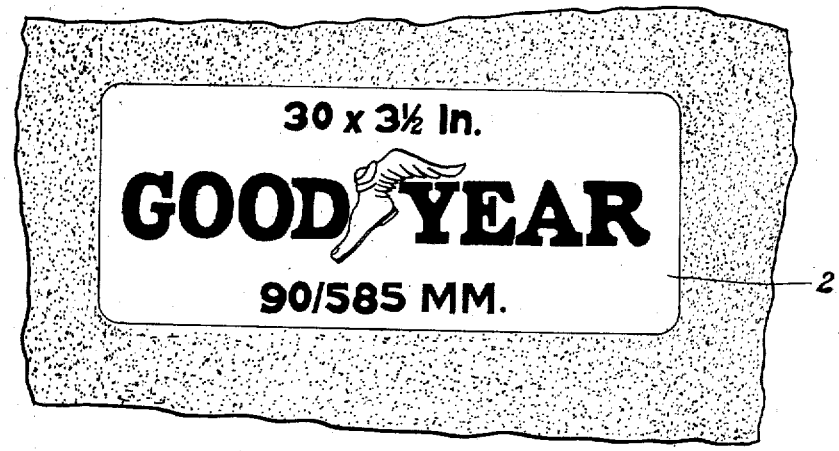
Figure 1 is a plan view of a portion of a rubber inner tube which has been marked in accordance with my invention.
Figure 2:
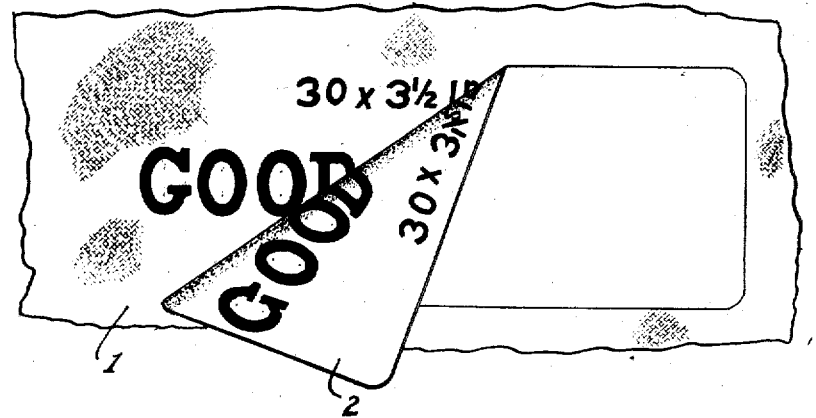
Figure 2 is a view illustrating a plurality of layers of material that are employed to provide the mark shown on the article in Figure 1.

In Figure 2 is shown a layer of material 1, which may be any suitable fibrous material, such as Holland cloth, or paper, or any suitable material providing a non-adhesive surface, or a surface which will not unite with the rubber when it is placed in engagement therewith during its uncured state and then subjected to the heat of vulcanization.

The layer of material 1 is provided with the mark desired by employing a lithographic ink or any suitable adhesive material upon which is disposed a powder, such as bronze powder, which when subjected to heat forms a black sulfide and produces a clearly defined imprint. It will be appreciated that various other materials may be employed to provide the mark desired upon the piece of uncured rubber 2 which is disposed in engagement with the sheet 1.

In practice the layer 1 is preferably a large sheet upon which a number of the marks or designs may be placed and a sheet of uncured rubber of the same size is disposed in engagement therewith, after which the superimposed sheets may be cut to provide separate marks.

Any suitable size or varnish may be used instead of ink to retain a suitable metallic powder in place until it has been subjected to heat to provide the desired mark. The exposed surface of the uncured piece of rubber 2 may then be treated with a solvent, such as benzine, or the article to be cured, or both, may have the solvent applied to the surface thereof to insure intimate engagement between the surface of the article to be marked and the piece of uncured rubber.

The piece of rubber with the layer of marking material 1 is disposed on the article to be marked and preferably subjected to a slight pressure to cause adhesion of the surfaces. The article is then subjected to the heat of vulcanization as in its ordinary course of construction, after which the layer 1 is removed.

The manner of disposing the uncured rubber and the layer of marking material contained thereon upon the article being marked depends to some extent upon the kind of article being marked. It will be apparent that the fibrous sheet and the uncured piece of rubber may be superposed in various ways, but it should be noted that the rubber receives the mark at the time the materials are disposed in intimate engagement. If calender rolls are employed, the heat of calendering aids the transfer of the marking material to the rubber. I have obtained a satisfactory transfer, however, by cold pressure in superposing the rubber and fabric.

The broad object of my invention, however, resides in the method of providing a mark of identification for an article of manufacture by employing a relatively thin layer of material carrying the mark which may be incorporated in the structure of the article being manufactured. Furthermore, it should be noted that the intermediate layer of rubber is preferably selected of such color as to afford a good color contrast between the article being marked and the ink or other substance constituting the mark.

The desirability of my invention and the advantages incident thereto are obvious since in the manufacture of any article the manufacturer is desirous of so marking the article as to insure the identification of its origin during its life.

It is obvious furthermore, that a mark is of little or no value unless it is clearly defined throughout the entire life of the article. The fibrous sheet, utilized in marking the uncured piece of rubber, is referred to as non-adhesive to distinguish it from a material which would become an integral part of the rubber when vulcanized.

Although I have illustrated in the drawings and specifically described the materials employed in my methods of making articles of manufacture, it is obvious that a wide selection of materials may be employed in accordance with my method without departing from the spirit or scope of my invention, and I desire therefore that no limitations shall be imposed except such as are indicated in the appended claims.

What I claim is:

1. A method of marking articles of manufacture that comprises marking a non-adhesive material with a transferable material, applying a piece of uncured rubber thereto, disposing the rubber upon the article to be marked, applying heat to cure the rubber and removing the non-adhesive material.

2. A method of marking articles of manufacture that comprises marking a non-adhesive material with a transferable material, applying a piece of uncured rubber thereto, applying a solvent to the exposed surface of the piece of uncured rubber, disposing the rubber upon the article to be marked, applying heat to cure the rubber and removing the non-adhesive material therefrom.

3. A method of marking articles of manufacture that comprises marking a non-adhesive material by applying an adhesive material in the desired design, disposing a material adapted to have its color set by the application of heat to the adhesive material, applying a piece of uncured rubber to the marked surface of the non-adhesive material, disposing the exposed surface of the uncured rubber upon an uncured rubber article, applying heat to cure the rubber and removing the non-adhesive material.

4. A method of marking articles of manufacture that comprises marking a non-adhesive material by applying an adhesive material to outline the desired design, disposing of a material adapted to have its color set by the application of heat to the adhesive material, applying a piece of uncured rubber to the marked surface of the non-adhesive material, applying a solvent to the exposed surface of uncured rubber, disposing the treated surface to engage an uncured rubber article, applying heat to cure the rubber and removing the non-adhesive material.

5. A method of manufacturing rubber articles that comprises forming the article of uncured rubber, marking a non-adhesive material with a transferable material, applying a piece of uncured rubber to the marked surface thereof, applying a solvent to the exposed surface of uncured rubber, disposing the piece of uncured rubber and its layer of non-adhesive material upon the uncured rubber article, applying heat to cure the rubber and removing the non-adhesive material.

In witness whereof, I have hereunto signed my name in the presence of two subscribing witnesses.

CLEM J. BURKLEY.

Witnesses:
J. E. KEATING,
L. M. HARTMAN.